United States Patent [19]

Stiefelmeyer et al.

[11] 3,835,313

[45] Sept. 10, 1974

[54] ARRANGEMENT FOR COMPENSATING FOR CHANGES IN THE OPERATING CHARACTERISTICS OF A MEASURING ELEMENT

[76] Inventors: Guenther Stiefelmeyer, Vordere str. 99, Bissingen; Guenther Schumm, Bruhlstr. 11/1, Beuren, both of Germany

[22] Filed: Apr. 10, 1973

[21] Appl. No.: 349,785

[52] U.S. Cl. .............................. 250/206, 250/214
[51] Int. Cl. ........................................ H01j 39/12
[58] Field of Search .......... 250/206, 208, 209, 214, 250/219 S, 219 D, 219 DF; 307/311

[56] References Cited
UNITED STATES PATENTS

| | | | |
|---|---|---|---|
| 3,400,270 | 9/1968 | Durig | 250/206 |
| 3,600,589 | 8/1971 | Hanson | 250/214 |
| 3,651,324 | 3/1972 | Carter | 250/206 |
| 3,652,791 | 3/1972 | Shuey | 250/214 |
| 3,660,670 | 5/1972 | Howard | 250/206 |
| 3,708,678 | 1/1973 | Kreda | 250/219 D |
| 3,714,441 | 1/1973 | Kreda | 250/207 |
| 3,743,837 | 7/1973 | Pooley | 250/206 |
| 3,746,865 | 7/1973 | Burch | 250/206 |

Primary Examiner—James W. Lawrence
Assistant Examiner—D. C. Nelms
Attorney, Agent, or Firm—Michael S. Striker

[57] ABSTRACT

A photoresistor forms part of a voltage divider whose tap is connected to the inverting input of a differential amplifier. A second voltage divider has a tap connected to the direct input of the differential amplifier. The differential amplifier output is connected to a capacitor through a parallel resistor-capacitor network. The voltage across the capacitor consitutes the emitter-base voltage of a transistor whose emitter-collector circuit is connected in parallel with one resistor of the second voltage divider. Changes in the operating characteristic of the measuring element cause a change in the voltage across the capacitor which in turn causes a change in the resistance of the emitter-collector circuit of the transistor in such a direction that the output voltage of the differential amplifier is independent of the changes of the operating characteristics of the measuring element.

5 Claims, 1 Drawing Figure

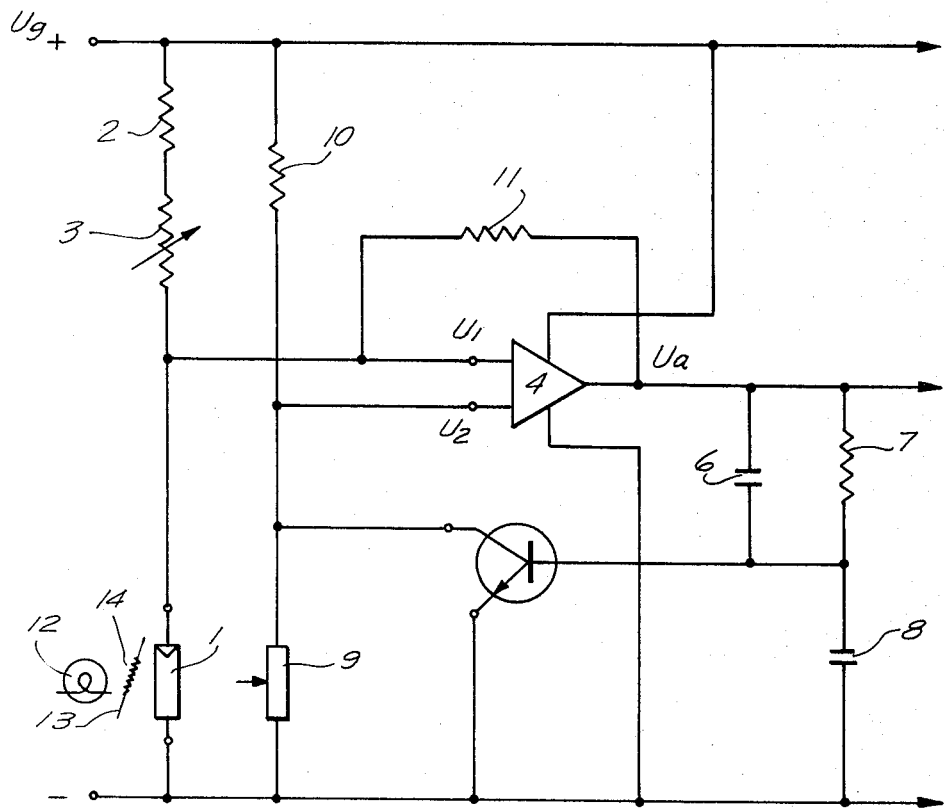

ARRANGEMENT FOR COMPENSATING FOR CHANGES IN THE OPERATING CHARACTERISTICS OF A MEASURING ELEMENT

BACKGROUND OF THE INVENTION

Many measuring circuits are known which comprise measuring elements whose electrical output varies as a function of a predetermined characteristic of an object or condition being monitored. The accuracy and reliability of the measurement, of course, depend upon the fact that the characteristic of the measuring element is substantially constant, that is that under a predetermined input condition the same electrical output will always result. However, these measuring elements are exposed to external influences such as temperature and humidity which tend to change the operating characteristic and are further subject to aging and other internal effects which have the same result. For example, the power output and the photoelectric efficiency of photodiodes or photoresistors in light barrier arrangements depend upon the intensity of illumination. Thus, changes in the intensity of illumination resulting, for example, from dust on the light furnishing surface or from variations in the supply voltage can cause a shift in the operating characteristic of the overall system, thereby changing the sensitivity and/or the threshold value at which the system operates.

SUMMARY OF THE INVENTION

It is an object of the present invention to furnish a circuit arrangement which allows an optimum independence of the variations of various operating characteristics such as voltage variations, high frequency interference pulses, dirt, or other changes and which further allows amplification.

The present invention resides in a measuring arrangement having a measuring element with an operating characteristic for furnishing a predetermined output in response to a predetermined input. The present invention is a system for compensating for changes in said operating characteristic and comprises means for furnishing a reference signal. It further comprises differential amplifier means having a first input connected to said measuring element, a second input connected to said means for furnishing a reference signal and an output for furnishing a signal corresponding to the difference between the signals applied to said first and second inputs. And further comprised are first capacitor means connected to said output of said differential amplifier means, for furnishing a drift signal corresponding to the change in the operating characteristic of said measuring element. Finally, control circuit means are provided which have an input connected to said first capacitor means and an output connected to said second input of said differential amplifier means for varying said reference signal as a function of said drift signal in such a manner that the signal at said differential amplifier output remains substantially independent of changes in said operating characteristic of said measuring element.

In a preferred embodiment of the present invention, the control circuit means comprise a transistor which has a base connected to the first capacitor means and an emitter-collector circuit connected in parallel with the means for furnishing a reference signal. Further, when the emitter-collector circuit of the transistor is completely nonconductive, a signal appears at the output of the differential amplifier which exceeds a predetermined signal and energizes an indicator or other element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic diagram of a preferred embodiment of the present invention.

DESCRIPTION OF THE PREFERRED EMBODIMENT

A preferred embodiment of the invention will now be discussed with reference to the drawing.

In the preferred embodiment of the invention shown in the drawing, the measuring element is a photoresistor 1 which forms a voltage divider together with a fixed resistor 2 and a variable resistor 3. The voltage divider is connected from the positive to the negative side of a voltage supply labeled $U_g$. Specifically, one terminal of photoresistor 1 is connected to the negative side of the voltage supply, while its other terminal is connected to variable resistor 3 whose other terminal is in turn connected to the fixed resistor 2. The common point of variable resistor 3 and photoresistor 1 constitutes the voltage divider tap and is connected to the inverting input of a differential amplifier 4. Photoresistor 1 receives light from a lamp 12. An object, for example a thread 13 whose diameter may undergo changes in size, passes between lamp 12 and photoresistor 1. Should the diameter of thread 13 increase suddenly, less light falls on photoresistor 14 causing its resistance to increase. The voltage at the above-mentioned voltage divider tap then becomes more positive, causing an increased positive voltage to appear at the inverting input of differential amplifier 4. Disregarding for a moment the operation of transistor 5, the voltage at the second input of differential amplifier 4 is a reference voltage, namely the voltage across a resistor 9 which, together with a further fixed resistor 10, forms a voltage divider across the voltage source $U_g$. The voltage at the output of differential amplifier 4 is, of course, proportional to the difference between the voltage applied at the direct input, namely the reference voltage in this embodiment, and the voltage applied at the inverting input. This output voltage is thus negative when increase in positive voltage at the inverting input. The output of the differential amplifier is labeled $U_a$. Connected to output $U_a$ is the parallel combination of a capacitor 6 and a resistor 7. The other terminal of the paralled combination is connected to a capacitor 8, herein referred to as first capacitor means, capacitor 8 having a second terminal connected to the negative side of the supply voltage $U_g$. A transistor 5 has a base connected to the common terminal of capacitor 8 and resistor 7 and has an emitter-collector circuit connected in parallel with resistor 9. Further, a feedback resistor 11 is provided between the output $U_a$ and the inverting input of differential amplifier 4. Resistor 11 is used to adjust the transfer characteristic of differential amplifier 4 for the intended purpose.

The above-described circuit operates as follows:

Photoresistor 1 receives light from a lamp 12, while an object 13, here a thread, passes between the lamp and the photoresistor. Let it now be assumed that the diameter of thread 13 increases suddenly, as indicated at portion 14. This causes the light falling on photoresistor 1 to be decreased suddenly, causing an equally sudden increase in resistance of the photoresistor and therefore an increase in positive voltage applied at the inverting input of differential amplifier 4. A negative voltage thus appears at the output of differential amplifier 4 which, if necessary after further amplification, can be used to activate a desired control function.

However, the problem arises that the voltage at the inverting input of differential amplifier 4 changes, not because of the change in the object being measured, but because of variations in the supply voltage, or because of changes in photoresistor 1 resulting from aging, dust, dirt or other factors. This change in voltage level would cause a corresponding change in the output voltage of differential amplifier 4. However, in accordance with the present invention, this change in level is compensated for as follows: a capacitor 8 charges through resistor 7 to a voltage corresponding to the new voltage level at the output of differential amplifier 4. This causes a change in voltage applied to the base of transistor 5, which in turn causes the emitter-collector resistance of transistor 5 to change. If, for example, the voltage across capacitor 8 becomes more negative, the emitter-collector resistance of transistor 5 will tend to increase, causing a corresponding increase in voltage at the direct input of differential amplifier 4. This change in voltage level at the direct input of differential amplifier 4 causes the output voltage of the differential amplifier to be returned to its original value. The circuit operation described here is thus an operation which relates to the steady state condition of the circuit.

Capacitor 6 serves to shunt high frequency pulses resulting from noise directly to the base of transistor 5. The resulting pulses applied at the reference input of the differential amplifier compensate for the pulses occurring at the inverting input in such a manner that the output of the differential amplifier is substantially free of such pulses.

When the voltage at the base of transistor 5 is such that the emitter-collector circuit of transistor 5 is completely nonconductive, only resistor 9 remains in the circuit. The value of resistor 9 and that of resistor 10 is so chosen that, in the absence of current flow through the emitter-collector circuit of transistor 5, the output voltage of differential amplifier 4 is sufficient to initiate a corresponding switching operation, for example, to an indicator to indicate that excess drift has taken place in the circuit.

Instead of a single transistor 5 as shown, a standard Darlington circuit may be used. Such a circuit is a standard component, and may be found, for example, in the book "Electronic Circuits: Discrete and Integrated" by Donald L. Shilling and Charles B. Love, McGraw-Hill, 1968, page 289, FIG. 851.

In an alternate preferred embodiment, resistor 9 is a variable resistor driven by a motor. The current through the excitation winding of the motor is the current flowing through the emitter-collector circuit of transistor 5. This mode of operation is indicated by the arrow on resistor 9 in the figure.

It is seen that the arrangement of the present invention is an economical and effective way to compensate for drift in the measuring element or in the supply voltage due to both internal and external causes.

While the invention has been illustrated and described as embodied in an arrangement using a particular type of compensating circuit, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various modifications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In a measuring arrangement having a measuring means having an operating characteristic for furnishing a predetermined output in response to a predetermined input, a system for compensating for internally or externally caused changes in said operating characteristic with resulting substantially steady state changes in said output comprising, in combination, means for furnishing a reference signal; differential amplifier means having a first input connected to said measuring means, a second input connected to said means for furnishing a reference signal and a differential amplifier output for furnishing a differential output signal corresponding to the difference between signals furnished at said first and second inputs; RC circuit means including a capacitor, connected to said differential amplifier output for furnishing a drift signal corresponding to said substantially steady state change in said predetermined output resulting from said change in said operating characteristic of said measuring means; and control circuit means having an input connected to said capacitor means and and output connected to said second input of said differential amplifier means, for varying said reference signal as a function of said drift signal, in such a manner that said differential amplifier output signal is independent of said changes in said operating characteristic of said measuring means.

2. An arrangement as set forth in claim 1, wherein said control circuit means comprise a transistor having a base connected to said capacitor and an emitter-collector circuit connected to said means for furnishing a reference signal in such a manner that said reference signal varies as a function of the resistance of said emitter-collector circuit.

3. An arrangement as set forth in claim 1, wherein said RC circuit means comprise a resistor connected in series to said capacitor; further comprising an additional capacitor connected in parallel with said resistor.

4. An arrangement as set forth in claim 1, wherein said control circuit means comprise a Darlington circuit.

5. An arrangement as set forth in claim 2 wherein said emitter-collector circuit of said transistor is blocked when said drift signal is a predetermined drift signal indicative of maximum allowable drift; and wherein said differential amplifier output signal exceeds a predetermined differential amplifier output signal when said emitter-collector circuit of said transistor is blocked; and further comprising threshold circuit means connected to said differential amplifier output for furnishing an indicator signal when said differential amplifier output signal exceeds said predetermined differential amplifier output signal.

* * * * *